2,920,099

Patented Jan. 5, 1960

2,920,099

PURIFICATION OF ALIPHATIC NITRILES

Eugene L. Ringwald, Decatur, Ala., assignor to The Chemstrand Corporation, Decatur, Ala., a corporation of Delaware No Drawing. Application December 30, 1957
Serial No. 705,790

6 Claims. (Cl. 260—465.8)

This invention relates to an improved process for purifying aliphatic nitriles and relates more particularly to the purification of aliphatic dinitriles by treating impure dinitriles such as adiponitrile with nitric acid.

In the preparation of aliphatic nitriles and dinitriles a large number of impurities are formed which are difficult to separate therefrom. Aliphatic dinitriles such as adiponitrile may be readily prepared from dicarboxylic acids and ammonia as is well known. One of the major industrial uses of adiponitrile is in the preparation of hexamethylene diamine by hydrogenation of the adiponitrile, which hexamethylene diamine may then be condensed with adipic acid to make nylon. High purity adiponitrile is necessary to make hexamethylene diamine of sufficient purity for use in manufacturing nylon of the quality required for the many uses, as in textiles, of nylon.

Adiponitrile, when prepared from adipic acid and ammonia in the presence of certain dehydration catalysts contains a number of impurities which are not readily separated from the adiponitrile by such standard purification methods as distillation, recrystallization or absorption, thus making it difficult to produce adiponitrile of the purity required to make nylon grade hexamethylene diamine therefrom. The undesirable impurities in adiponitrile for such use are oxidizable materials which may be determined analytically by titration of the adiponitrile with a potassium permanganate solution. The undesirable impurities in adiponitrile used to make nylon grade hexamethylene diamine are reported in this specification in terms of potassium permanganate demand, as will be defined herein below, and this value is also employed to establish the purity of the treated dinitriles.

It is an object of this invention to provide a new method for purifying aliphatic nitriles. It is another object of this invention to provide a process for producing aliphatic dinitriles having a low potassium permanganate demand. It is a further object of this invention to provide a rapid and economical process for preparing high purity adiponitriles which can be converted by hydrogenation into nylon grade hexamethylene diamine. Other objects and advantages of the invention will be apparent from the description which follows.

I have now found, quite unexpectedly, that nitriles may be purified by treating the impure nitrile with nitric acid. It has been further found that such aliphatic dinitriles as adiponitrile containing oxidizable impurities may be readily purified to provide adiponitrile having low potassium permanganate demand, which adiponitrile is readily converted into nylon grade hexamethylene diamine by simple hydrogenation. This improved and novel process for preparing purified nitriles is rapid and economical and provides dinitriles such as adiponitrile of a purity not readily obtained by the usual physical purification methods such as distillation, crystallization or absorption alone, or by chemical means as by treatment with a bisulfite compound or sulfur dioxide.

In essence, in the practice of this invention, impure dinitriles such as adiponitriles containing oxidizable impurities are treated with nitric acid, which treated adiponitrile thereafter is distilled. Normally the dinitriles treated in accordance with this invention will have been distilled once after preparation and before treatment with nitric acid.

As stated above, undesirable oxidizable impurities in adiponitrile are readily determined by titration with a potassium permanganate solution, by a back titration technique. The potassium permanganate demand reported in percent as determined by back titration may be defined as the weight percent of potassium permanganate required to oxidize all the oxidizable impurities present in the adiponitrile. A simple procedure to determine this value is to react 25 ml. of 0.1 N potassium permanganate with 2.0 ml. of adiponitrile in 50 ml. of 6 N sulfuric acid solution for 20 minutes at 25° C. At the end of this time the reaction is stopped by reducing the excess potassium permanganate with 20 ml. of 20 percent aqueous potassium iodide solution. The free iodine is titrated with 0.5 N sodium thiosulfate using a starch indicator. A blank is run by the same procedure in the absence of adiponitrile. Many of the undesirable oxidizable impurities in the adiponitrile are of the class of derivatives of cyclopentanone. The amount of nitric acid employed will be at least enough to react with the oxidizable impurities in the nitrile.

The amount of nitric acid (calculated as 100 percent acid) required to treat a particular impure dinitrile such as adiponitrile is based for convenience on the potassium permanganate demand, the amount of acid being greater than one-half, preferably two thirds of the potassium permanganate demand. For example, if the potassium permanganate demand of a particular impure adiponitrile is 1.5 percent (1.5 grams of potassium permanganate per 100 grams of adiponitrile), about 1 percent (1 gram of nitric acid calculated as 100 percent acid) would normally be used to treat 100 grams of the adiponitrile. Lesser amounts of acid might require a second treatment to reduce the potassium permanganate demand of the adiponitrile to the desired level. Large amounts or excesses of acid may of course be employed, but such excesses normally are uneconomical. The amount of acid may be varied from about 0.1 to about 25 percent nitric acid, calculated as 100 percent nitric acid, and more preferably from about one-half to above five percent $HNO_3$. The strength of nitric acid employed may be varied quite widely from about 1 to about 80 percent nitric acid, more preferably from about 10 to about 70 percent. With nitriles containing large amounts of oxidizable impurities, more than one treatment with nitric acid may be required or desired for operational convenience.

The temperature at which the dinitrile is treated with nitric acid may be varied over a wide range. Normal operating temperatures of about 85° C. to about 125° C. produce purified dinitriles in reasonable times which have the desired low potassium permanganate demand. More preferably, the temperature of treatment will be from about 95° C. to about 115° C. Although treating temperatures as low as 60° C. and as high as 150° C. may be used, at low temperatures slower reactions are encountered and some tars may form which will be noted during later processing steps, and the color stability of the dinitrile may be affected by high temperature treatment.

The time of treatment likewise may be varied depending to some extent upon the temperature of treatment. Treatment times from about 10 to about 60 minutes are ordinarily employed, it being understood of course that the shortest exposure time consistent with the desired purity or potassium permanganate demand of nitrile will be employed, as will be apparent to those skilled in the art. In purifying adiponitrile for example, treatment with nitric acid for 18 minutes at 125° C. is equivalent to treatment for 37 minutes at 100° C. Optimum results are usually obtained at about 100° C. for times of about 30 to 60 minutes. It is understood of course that the nitriles may be treated with nitric acid in either batch or continuous processes.

In batch processes, optimum results normally will be obtained at a temperature of 100° C. to 105° C. and a reaction time of 60 minutes with nitric acid of a concentration of about 45 to 70 percent. In continuous operations, shorter reaction times may be employed such as 40 minutes at 100° C. to 105° C. The reaction mixture, at the end of these treating periods preferably is washed with 5 percent sodium hydroxide solution at about 50° C. or 60° C. The potassium permanganate demand of the nitrile at this point is desirably less than about one percent, more preferably less than about 0.5 percent and in such a range, distillation of the treated nitrile will result in nitriles having potassium permanganate demand less than about 0.15 percent.

The procedure for treating the impure nitrile with nitric acid is subject to wide variations, generally depending upon the purity of nitrile desired and particular production operations as will be understood by those skilled in the art. As has been stated, the impure nitrile may be treated with nitric acid by either batch or continuous processes. Generally in batch operations the required amount of nitric acid to react with the impurities in the nitrile, as determined by potassium permanganate demand, and the nitrile are mixed together and heated at a temperature in the range of about 80° C. to 120° C. for up to about one hour. The reaction mixture is then cooled and washed with dilute alkali solution to remove the oxidized impurities and any residual nitric acid. A water wash will remove the alkali, and a weak acid solution may be used to bring the pH of the dinitrile down to about 7. The dinitrile is then separated from the water wash and distilled. Normally a center fraction of distillate will have the desired purity and recovery usually will be greater than about 75 percent, usually greater than 95 percent, of the aliphatic nitrile in the crude material. If desired, the alkali and water washing stages may be omitted and the nitrile distilled from the reaction mixture of impure nitrile and nitric acid; but normally, better results are obtained when the reaction product is alkali washed prior to distillation.

Likewise, a variety of continuous procedures may be employed to purify the nitrile. The following sequence of steps is one useful continuous method. The impure nitrile is treated by mixing continuously with the required amount of nitric acid as defined hereinbefore at a temperature in the range of about 90° C. to 110° C. with a contact or residence time from about 15 to about 60 minutes. The reaction mixture is then fed to a continuous caustic washer in a ratio of about 3 parts of nitrile to about 1 part of 5 percent aqueous sodium hydroxide or potassium hydroxide. This amount of alkali is usually sufficient to neutralize the oxidized impurities and maintain a pH of 11 to 13. This mixture is then continuously fed to a decanter where the aqueous lower layer containing the oxidized impurities is continuously removed. The top nitrile layer is fed into a mixer with water in a ratio of about 1 part of water to 4 parts of nitrile. The overflow from this mixer is fed into another decanter from which the top layer of washed nitrile is fed to a distillation column and the lower layer of wash water is drawn off. The temperature throughout the wash train is usually maintained at about 55° C. to 60° C. It normally is desirable that the nitrile be given an additional washing with dilute sulfuric acid and water so that the nitrile which is to be distilled has a pH of about 7. The final distillation step requires only conventional procedures and equipment but is preferably conducted under reduced pressure.

It will be understood that the novel process of this invention may be to remove oxidizable impurities from aliphatic nitrile or dinitrile. The process is readily applied to saturated aliphatic nitriles and dinitriles containing 3 to 20 carbon atoms, and is advantageously applied to the purification of saturated aliphatic nitriles and dinitriles containing 4 to 10 carbon atoms. Typical of the nitriles and dinitriles which may be treated by the process of this invention are propanenitrile, butanenitrile, hexanenitrile, octanenitrile, dodecanenitrile, octadecanenitrile, malononitrile, succinonitrile, glutaronitrile, azelaonitrile, sebaconitrile, and the like.

The practice of the invention and typical embodiments thereof are set forth in the examples below.

*Example I*

Equipment for continuous nitric acid treatment of adiponitrile was set up, consisting of, in a series and arranged for gravity flow from the first reactor to the last decanter: (1) a primary reactor into which 1.5 percent $HNO_3$ (calculated as 100 percent $HNO_3$) as 50 percent nitric acid and impure adiponitrile which had been distilled once after preparation and had a potassium permanganate demand of 1.5 was fed continuously; the overflow from this vessel being fed by gravity into (2) a secondary reactor, the temperature of the mixture in the two reactors being at about 100° C. to 105° C., and the average holdup time in the two reactors being about 37 minutes; the overflow from the secondary reactor being fed by gravity into (3) a gas separator; and then by gravity into (4) a vessel equipped with an agitator along with a 5 percent aqueous sodium hydroxide solution at 50° C. to 60° C. in a ratio of 2.7 parts adiponitrile to one part caustic; which mixture is gravity fed into (5) a decanter where the caustic solution was drawn off; and the treated adiponitrile gravity fed into (6) a wash vessel with water in a flow ratio of 1 part water to 4 parts of adiponitrile; and then by gravity into (7) a decanter from which the treated adiponitrile was withdrawn and the waste water discarded. The adiponitrile at this stage had a potassium permanganate demand of about 0.4. The adiponitrile was distilled and after distillation had a potassium permanganate demand of less than about 0.01 percent. This product had a freezing point of 2.35° C., APHA color value of 17, acidity as sulfuric acid of 0.0013%, and excellent shelf life. The yield of adiponitrile was more than 95 percent of the adiponitrile in the impure adiponitrile. Polarographic and ultraviolet examination of this sample showed only a trace of any oxidizable impurities. This sample of adiponitrile was readily batch hydrogenated to nylon grade hexamethylene diamine of a quality and yield equivalent to that obtained from adiponitrile by the best known purification procedures.

A standard rocking bomb was charged with 250 grams of adiponitrile, 21 grams of Raney cobalt catalyst and 183 grams of liquid anhydrous ammonia. The bomb was then pressurized with hydrogen to 2700 pounds and heat was applied to raise the temperature to 105° C. to 120° C. while supplying hydrogen to maintain the pressure between about 2500 to 4000 p.s.i.g. The reaction was essentially complete in 2–2½ hours. After cooling to room temperature, the bomb was vented to remove the ammonia and hydrogen. The hydrogenated product was dissolved in methanol and this solution filtered. The filtered methanol solution of hexamethylene diamine was placed in a still, the methanol stripped off at atmospheric pressure and the hexamethylene diamine distilled at 102° C. at 30 mm. pressure. The amount of hexamethylene diamine recovered, based on the adiponitrile, was 91.5 percent. During the distillation, cuts of hexamethylene diamine were collected. A composite was made of cuts 2, 3, and 4 and this composite material had a freezing point of 40.746° C. and represented 80 percent of the hexamethylene diamine. This material was readily reacted with adipic acid to form textile grade nylon which in turn was spun to form fibers of excellent physical properties.

*Example II*

Following the general procedure in Example I a series of continuous reactions with adiponitrile having a potassium permanganate demand value of 1.7 were run. The results of these runs are summarized in the table below.

$KM_nO_4$ Demand Of Adiponitrile

| Sample Treatment | 1.5% $HNO_3$ at 100° C., 37 min. | 1.5% $HNO_3$ at 125° C., 18 min. | 1.5% $HNO_3$ at 100° C., 18 min. | 1.5% $HNO_3$ at 125° C., 37 min. | 1.5% $HNO_3$ at 100° C., 18 min. |
|---|---|---|---|---|---|
| After 5% NaOH wash | 0.59 | 0.57 | 0.68 | 0.49 | 0.64 |
| After Batch $H_2O$ | 0.44 | 0.41 | 0.67 | 0.42 | 0.63 |
| Cuts from Distillation: | | | | | |
| I | 0.26 | 0.31 | 0.37 | 0.60 | 0.32 |
| II | 0.12 | 0.07 | 0.12 | 0.19 | 0.10 |
| III | 0.08 | 0.03 | 0.10 | 0.09 | 0.09 |
| IV | 0.04 | 0.04 | 0.10 | 0.05 | 0.12 |
| V | 0.05 | 0.05 | 0.05 | 0.17 | 0.16 |

Cuts II, III, IV and V represent 80% recovered adiponitrile from the crude impure material, and this in turn represents greater than about 98% of the adiponitrile in the impure material.

*Example III*

120 grams of impure adiponitrile with a potassium permanganate demand of 1.5, which was prepared by distilling the crude reaction mixture obtained when adipic acid and ammonia were reacted over a phosphoric acid type dehydration catalyst, was treated with 2.0 ml. of 70 percent nitric acid by stirring at 90° C. to 100° C. for one hour. This reaction mixture was distilled under vacuum and the adiponitrile recovered was colorless, heat and light stable, and had a potassium permanganate demand of only 0.03 percent.

*Example IV*

A series of experiments were run wherein impure adiponitrile was treated with nitric acid in a batch process and the reaction product was continuously alkali washed. 2 to 2.5 liter batches of impure adiponitrile were treated with nitric acid (calculated as 100 percent nitric acid), in various concentrations and temperatures for 1 hour. The reaction mixtures were then fed to a continuous caustic washer in a ratio of 2.7 parts of adiponitrile to 1 part of 5 percent aqueous sodium hydroxide solution at a temperature of 50° C. to 60° C. This mixture was agitated and the water layer containing the impurities were continuously removed. The top adiponitrile layer was also continuously fed to a secondary mixer and was washed with water in a ratio of 1 part of water to 4 parts of adiponitrile at a temperature of about 55° C.–65° C. The adiponitrile was then washed with dilute sulfuric acid. The purified adiponitrile was then distilled.

The results of this series of runs are summarized in the following table.

| | Run No. 1 | Run No. 2 | Run No. 3 | Run No. 4 | Run No. 5 | Run No. 6 | Run No. 7 |
|---|---|---|---|---|---|---|---|
| ADN, gms | 2,000 | 2,500 | 2,500 | 2,600 | 2,600 | 500 | 500 |
| $KMnO_4$ Demand | 1.7 | 1.7 | 1.24 | 1.24 | 1.24 | 1.24 | 1.24 |
| $HNO_3$, gms | 28.0 | 50.0 | 39 | 40.5 | 40 | 40 | 200 |
| Conc., $HNO_3$ Percent | 70 | 50 | 49 | 49 | 50 | 10 | 2 |
| Percent Treatment, 100% $HNO_3$ (Calc.) | 1.0 | 1.0 | 0.75 | 0.75 | 0.75 | 0.80 | 0.80 |
| Temp., ° C | 105 | 93 | 105 | 85 | 125 | 105 | 100 |
| Length Heating, Min | 60 | 60 | 60 | 60 | 60 | 60 | 60 |
| $KMnO_4$ Demand | 0.65 | 0.58 | 0.40 | 0.39 | 0.32 | 0.43 | 0.72 |
| Distillation, $KMnO_4$ Demand of Cuts: | | | | | | | |
| I | 0.42 | 0.33 | 0.19 | 0.18 | 0.14 | 0.48 | |
| II | 0.28 | 0.20 | 0.075 | 0.06 | 0.075 | 0.14 | |
| III | 0.15 | 0.16 | 0.07 | 0.06 | 0.05 | 0.13 | |
| IV | 0.11 | 0.11 | 0.07 | 0.05 | 0.06 | 0.13 | |
| V | 0.08 | 0.14 | 0.05 | 0.08 | 0.08 | 0.12 | |

Cuts II, III, IV and V represent a yield of 98% of the adiponitrile in the impure adiponitrile which in turn is 80% of the impure adiponitrile.

When the above examples are repeated with other nitriles such as butanenitrile and other dinitriles such as glutaronitrile and sebaconitrile, similar excellent results are obtained and purified materials substantially free of oxidizable impurities are obtained. Similarly, when adiponitrile with lesser or greater amounts of oxidizable impurities are similarly treated with nitric acid in the amounts and concentration set forth hereinabove, similar excellent results are obtained.

I claim:

1. A process for purifying adiponitrile which comprises the steps of (1) treating adiponitrile containing oxidizable impurities with nitric acid of a concentration of about 10 to about 70 percent nitric acid, the amount of nitric acid calculated as 100 percent nitric acid being from about 0.5 to about five percent nitric acid, at a temperature in the range of about 60° C. to about 150° C. for about 10 to about 60 minutes, (2) washing the resultant treated adiponitrile with an aqueous alkali solution and (3) separating the purified adiponitrile by distillation.

2. A process for purifying adiponitrile which comprises the steps of (1) treating adiponitrile containing oxidizable impurities with nitric acid of a concentration of about 45 to about 70 percent nitric acid, the amount of nitric acid calculated as 100 percent nitric acid being from about 0.5 to about five percent nitric acid, at a temperature in the range of about 95° C. to about 115° C. for about 30 to 60 minutes, (2) washing the resultant treated adiponitrile with a dilute aqueous alkali solution and (3) separating the purified adiponitrile by distillation.

3. A process for purifying adiponitrile which comprises the steps of (1) treating adiponitrile containing oxidizable impurities with nitric acid of a concentration of about 45 to about 70 percent nitric acid, the amount of nitric acid calculated as 100 percent nitric acid being from about 0.5 to about 2 percent nitric acid, at a temperature of about 100° C. for about 30 to 60 minutes, (2) washing the resultant treated adiponitrile with a dilute aqueous sodium hydroxide solution and water at about 50° C. to 60° C. and (3) separating the purified adiponitrile by distillation.

4. A process for purifying adiponitrile which comprises the steps of (1) treating adiponitrile which contains oxidizable impurities with about 0.5 to about 2 percent nitric acid, calculated as 100 percent nitric acid, in a concentration of about 45 to about 70 percent, at a temperature in the range of about 95° C. to 115° C. for about 30 to 60 minutes, (2) washing the resultant treated adiponitrile with a dilute water solution of an alkali metal hydroxide having a concentration of alkali metal hydroxide from about 1 to about 10 percent, (3) then washing said treated adiponitrile with water, both steps 2 and 3 being conducted at a temperature in the range of about 50° C. to 60° C. and (4) recovering the purified adiponitrile by distillation.

5. A continuous process for purifying adiponitrile which comprises the steps of continuously contacting in a primary reactor adiponitrile containing oxidizable impurities for a period of time from about 15 to about 60 minutes with an aqueous solution containing about 10 to about 70 percent nitric acid, the amount of nitric acid calculated as 100 percent nitric acid being from about 0.5 to about five percent nitric acid, and maintained at a temperature in the range of about 90° C. to 110° C., continuously removing the thus treated adiponitrile from said primary reactor, then continuously feeding the adiponitrile through a secondary reactor containing an aqueous alkali solution, thereafter continuously washing the adiponitrile with water and continuously feeding the washed adiponitrile to a distillation column wherein the adiponitrile is distilled, whereby substantially pure adiponitrile is produced.

6. The method of claim 5 wherein the adiponitrile immediately after being washed with water is continuously contacted with dilute aqueous sulfuric acid solution.

References Cited in the file of this patent
UNITED STATES PATENTS

| | | |
|---|---|---|
| 2,286,559 | McAllister | June 16, 1942 |
| 2,305,103 | Osgood | Dec. 13, 1942 |
| 2,478,243 | Coe et al. | Aug. 9, 1949 |

UNITED STATES PATENT OFFICE

CERTIFICATE OF CORRECTION

Patent No. 2,920,099                                    January 5, 1960

Eugene L. Ringwald

It is hereby certified that error appears in the printed specification of the above numbered patent requiring correction and that the said Letters Patent should read as corrected below.

Column 2, line 55, for "above five percent" read -- about five percent --.

Signed and sealed this 14th day of June 1960.

(SEAL)

Attest:

KARL H. AXLINE                                                  ROBERT C. WATSON
Attesting Officer                                                Commissioner of Patents